(12) United States Patent
Kuczynski et al.

(10) Patent No.: US 8,889,046 B2
(45) Date of Patent: Nov. 18, 2014

(54) VISUAL INDICATION OF IMPROPERLY PROCESSED PLASTIC PARTS

(75) Inventors: Joseph Kuczynski, Rochester, MN (US); Melissa K. Miller, Research Triangle Park, NC (US); Heidi D. Williams, Cary, NC (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 13/312,450

(22) Filed: Dec. 6, 2011

(65) Prior Publication Data
US 2013/0140727 A1    Jun. 6, 2013

(51) Int. Cl.
*B29C 47/92*    (2006.01)

(52) U.S. Cl.
USPC .......... 264/40.1; 264/328.17; 264/328.18; 264/51; 264/52; 264/53; 264/54; 264/55; 264/331.14; 252/960; 252/962; 252/408.1; 252/301.16; 252/301.34; 252/301.35; 521/79; 521/80; 521/81

(58) Field of Classification Search
CPC .. B29C 45/0025; B29C 45/768; B29C 45/78; B29C 2945/7604; B29C 2945/76163; B29C 2945/76936; B29K 2105/0005; B29K 2105/0052; G01N 21/88; G01N 21/8803
USPC .......... 264/328.17, 328.18, 40.1, 51, 52, 53, 264/54, 55, 331.14; 252/960, 962, 408.1, 252/301.16, 301.34, 301.35; 521/79, 80, 81
See application file for complete search history.

(56) References Cited

U.S. PATENT DOCUMENTS

| | | | |
|---|---|---|---|
| 2,132,969 A | 10/1938 | Rau | |
| 2,634,243 A | 4/1953 | Glenn | |
| 3,065,189 A | 11/1962 | Becke et al. | |
| 3,150,214 A * | 9/1964 | Scalora et al. | 264/53 |
| 3,781,183 A * | 12/1973 | Doll | 428/136 |
| 4,133,858 A * | 1/1979 | Hayakawa et al. | 264/54 |
| 4,280,005 A * | 7/1981 | Fox | 521/90 |
| 5,490,475 A | 2/1996 | Bryant et al. | |
| 6,929,764 B2 | 8/2005 | Jiang et al. | |
| 7,480,542 B2 | 1/2009 | Kroeger et al. | |
| 7,585,166 B2 | 9/2009 | Buja | |
| 2002/0143073 A1 | 10/2002 | Jiang et al. | |
| 2002/0153088 A1* | 10/2002 | Chen et al. | 156/244.11 |
| 2006/0131771 A1* | 6/2006 | McBain et al. | 264/40.1 |

* cited by examiner

*Primary Examiner* — Timothy Kennedy
(74) *Attorney, Agent, or Firm* — Katherine S. Brown; Jeffrey L. Streets

(57) ABSTRACT

A method comprising injection molding a plastic part from a polymer formulation comprising an injection moldable thermoplastic and an additive, wherein the additive has a decomposition temperature that establishes a maximum processing temperature for the polymer formulation. The additive will thermally decompose to generate gaseous products causing visible bubble formation in the surface of the plastic part in response to exposure to a processing temperature that exceeds the decomposition temperature of the additive. A suitable additive may be, for example, selected from oxalates, carbamic acids, carbonic acids, diazocarbonyl compounds, and combinations thereof.

16 Claims, 1 Drawing Sheet

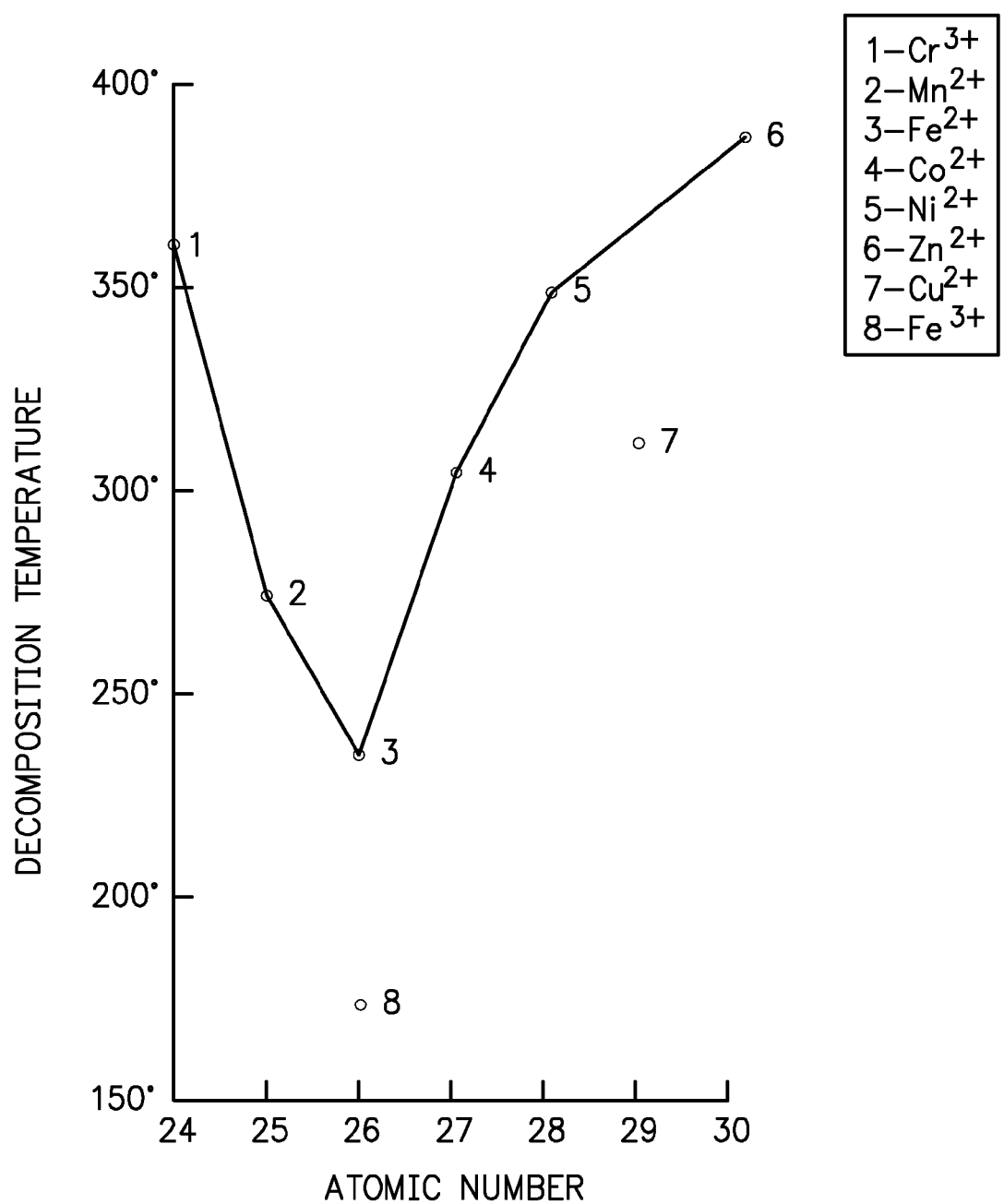

VISUAL INDICATION OF IMPROPERLY PROCESSED PLASTIC PARTS

BACKGROUND

1. Field of the Invention

The present invention relates to the formation of plastic parts, and more particularly to detecting the use of an improper processing temperature.

2. Background of the Related Art

Computer systems are complex combinations of parts working together to accomplish a design objective. Aside from the actual computers, servers, switches, network hardware and the like, the infrastructure used to arrange and manage the computer hardware can also be complex and may involve numerous parts that are especially made for a particular purpose.

Plastic parts are beneficial for use in the infrastructure of a computer system because they are inexpensive to make, they are generally electronically non-conductive, and they are strong without being heavy. Accordingly, many of components in the computer system will be made from plastic. Furthermore, these same advantages that make plastic a useful material in computer systems also make plastics useful in non-limiting applications, ranging from household items to automotive parts.

However, plastic parts must be processed properly in order to avoid degradation and obtain their intended physical properties, such as strength. For example, it is important to form the plastic part at the manufacturer's recommended temperature in order to avoid compromising the flexural strength, fatigue resistance, or other physical properties of the plastic. Even normal use of such parts may result in broken parts. It is unfortunate that manufacturers may process plastic parts under conditions that are outside of the resin manufacturer's recommended process conditions in order to produce more parts in the shortest period of time. Once these parts have been made, detection of improper processing through expensive and time consuming analytical techniques is not routinely performed.

Unfortunately, the compromised physical properties of the molded plastic part may not become evident until long after the part has been in service and suffers a failure during use. At that point, the failed part must be replaced at the expense of the additional part, inconvenience, and potential downtime of related devices. For example, if a plastic latch used to secure a hard disk drive into a chassis bay was formed under improper conditions, the latch may break during use. As a result of the broken latch, a new latch or new carriage for the hard drive may be required. Until the broken part is satisfactorily replaced, the hard drive itself may remain out-of-service.

BRIEF SUMMARY

One embodiment of the present invention provides a method comprising injection molding a plastic part from a polymer formulation comprising an injection moldable thermoplastic and an additive, wherein the additive has a decomposition temperature that establishes a maximum processing temperature for the polymer formulation. The additive will thermally decompose to generate gaseous products causing visible bubble formation in the surface of the plastic part in response to exposure to a processing temperature that exceeds the decomposition temperature of the additive.

BRIEF DESCRIPTION OF THE SEVERAL VIEWS OF THE DRAWINGS

FIG. 1 is a graph showing the decomposition temperature for each of a number of different metal oxalates.

DETAILED DESCRIPTION

One embodiment of the present invention provides a method for determining whether an injection moldable thermoplastic has been processed at a proper temperature. The method comprises injection molding a plastic part from a polymer formulation comprising an injection moldable thermoplastic and an additive, wherein the additive has a decomposition temperature that prevents the use of plastic parts processed at a processing temperature greater than the decomposition temperature, and wherein the additive will thermally decompose to generate a gas causing visible bubbles or voids in the surface of the plastic part in response to exposure to a processing temperature that exceeds the decomposition temperature of the additive.

Non-limiting examples of the injection moldable thermoplastics include polycarbonate (PC), acrylonitrile butadiene styrene (ABS), polyethylene terephthalate (PET), polybutylene terephthalate (PBT), liquid crystal polymers (LCP), polyamide (PA), polyphenylene oxide (PPO), any other injection moldable thermoplastic, or blends of thermoplastics.

The additives are compounds that decompose to give off a gas at a temperature (i.e., a decomposition temperature), which corresponds to a given resin processing temperature. For example, the additives may, without limitation, be selected from oxalates (which decompose to evolve water vapor ($H_2O$), carbon monoxide (CO) and/or carbon dioxide ($CO_2$)), carbamic acids (which are thermally unstable and decompose via release of carbon dioxide ($CO_2$)), carbonic acids (which release of carbon dioxide ($CO_2$)), and diazocarbonyl compounds (which liberate nitrogen gas ($N_2$)), or other compounds may be used. Though the invention is not limited by the decomposition reactions of the additives, the following are believed to represent at least one of the decomposition reactions that these compounds may follow:

For a metal oxalate, either:

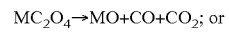

$MC_2O_4 \rightarrow MO + CO + CO_2$; or

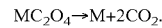

$MC_2O_4 \rightarrow M + 2CO_2$.

For carbamic acids:

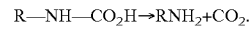

$R-NH-CO_2H \rightarrow RNH_2 + CO_2$.

For carbonic acids:

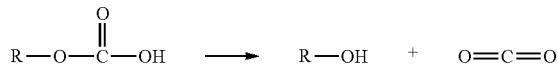

For diazocarbonyls:

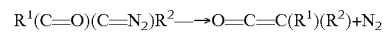

$R^1(C=O)(C=N_2)R^2 \rightarrow O=C=C(R^1)(R^2) + N_2$

Oxalate $(C_2O_4)^{2-}$, also written $(COO)_2^{2-}$, is a dianion that combines with many metal cations to form insoluble precipitates. Non-limiting example of oxalates and their decomposition temperatures are given in FIG. 1.

FIG. 1 is a graph showing the decomposition temperature for each of a number of different metal oxalates. The temperature at which a given oxalate compound will thermally decompose is a well-known value. However, for any of the additives, including oxalates, the temperature at which the additive will thermally decompose and evolve gaseous products may be determined through simple thermogravimetric (TGA) analysis. The exact temperature at which bubble formation occurs may vary slightly depending, in part, on the thermoplastic (i.e., the melt viscosity) and the molding parameters (because melt viscosity generally follows a power law dependence with temperature, i.e., the higher the melt temperature, the lower the viscosity).

The thermally decomposable additive generates gaseous products when it decomposes. Those gaseous products may include water ($H_2O$), carbon monoxide (CO), carbon dioxide ($CO_2$), nitrogen gas ($N_2$), and combinations thereof. For example, the oxalates decompose to release CO and/or $CO_2$, carbamic acids decompose to release carbon dioxide ($CO_2$), carbonic acids decompose to release carbon dioxide ($CO_2$), and diazocarbonyl compounds liberate nitrogen gas ($N_2$). If the polymer formulation is exposed to temperatures greater than the maximum processing temperature, then the additive decomposes and one or more of the gaseous products are evolved. The gas evolution causes bubbles, voids or other forms of surface irregularities to form in the plastic part. Bubbles or voids forming on the surface of the plastic part are clearly visible to the naked eye. Accordingly, improper processing of a plastic containing the thermally decomposable compound will render the molded part useless. The polymer formulation preferably includes only a small fraction of the thermally decomposable additive, such as less than one percent of the polymer formulation.

In accordance with the present invention, the decomposition temperature of the additive establishes a maximum processing temperature for the polymer formulation. Therefore, it is preferable to select an additive having a decomposition temperature that correlates with a manufacturer's recommended processing temperature for the thermoplastic. For any given thermoplastic, the recommended processing temperature is well documented.

In one example, the recommended processing temperature range for a polycarbonate-acrylonitrile butadiene styrene (PC/ABS) blend is between 230° C. and 280° C. In this example, the maximum processing temperature is 280° C. By selecting and blending an appropriate oxalate, a proper processing temperature can be ensured. For example, cobalt (Co) oxalate and copper (Cu) oxalate both have a decomposition temperature that is just greater than 300° C. (See FIG. 1, points 4 and 7). Accordingly, adding either cobalt oxalate or copper oxalate into the PC/ABS prior to processing will ensure that the PC/ABS is processed without exceeding 300° C., which is just 20° C. above the maximum recommended processing temperature.

In another example, it may be preferable to use manganese oxalate, which has a decomposition temperature of about 275° C., as the additive in the PC/ABS. This combination of PC/ABS and manganese oxalate provides a decomposition temperature that is 5° C. less than the maximum recommended processing temperature for the PC/ABS. Using manganese oxalate in the PC/ABS ensures that the resin is molded well within the specified parameters (i.e., below 280° C.), since a processing temperature exceeding 275° C. will result in an unusable part. In other embodiments, the decomposition temperature of the additive is less than the maximum recommended processing temperature for the thermoplastic by no more than 20° C.

Since only small quantities of the oxalate are required to generate sufficient gas to visibly detect improper molding conditions, the addition of the oxalate into the resin does not alter the bulk physical properties of the resin. The additive should be inert to reactions with the thermoplastic under the conditions expected to be experienced in processing the injection moldable thermoplastic. So long as the actual processing temperature is less than the decomposition temperature of the additive, the additive should have essentially no negative effect on the physical properties of the plastic part.

As a general matter, a suitable additive might be one that thermally decomposes and generates gaseous products (such as $H_2O$, CO, $CO_2$, $N_2$, etc.) at a temperature that is up to 20° C. greater than the maximum recommended processing temperature. Preferably, the additive will have decomposition temperature that is no more than 5° C. greater than the maximum recommended processing temperature. The exact additive selected for a given thermoplastic may be determined on an empirical basis in order to provide an acceptable margin between the decomposition temperature of the additive and the maximum processing temperature of the thermoplastic.

If the decomposition temperature of the selected additive is greater than the maximum processing temperature of the thermoplastic, for example by 5° C., and the thermoplastic is processed at a temperature up to the maximum recommended processing temperature, then the additive will not decompose and will not cause surface irregularities in the molded plastic part. However, if the thermoplastic is processed at a temperature exceeding the maximum recommended processing condition by more than 5° C., then the additive will thermally decompose, generate gaseous products, and cause visibly detectable surface irregularities, such as bubbles and voids.

An additive may also have a decomposition temperature that is less than the maximum processing temperature. However, an additive that decomposes at temperatures much lower (i.e., more than 20° C. lower) than the maximum recommended processing condition for a given thermoplastic may not be a good selection for mixing with the given thermoplastic, since surface irregularities might still occur despite processing under the recommended maximum processing temperature.

An additive, such as one of the non-limiting examples of oxalates identified in FIG. 1, is compounded with the thermoplastic resin in a concentration that is sufficient to result in a visible cosmetic defect if the thermoplastic is processed at temperature exceeding the recommended processing temperature. An effective additive concentration for a given thermoplastic may be easily determined by formulating and processing several batches of a given thermoplastic with varying additive concentrations and various temperatures above and below the maximum processing temperature for the thermoplastic, and/or above and below the decomposition temperature for the additive. If the processing temperature exceeds the decomposition temperature, but there are no obvious visual defects in the surface of the plastic part, then the additive concentration should be increased. However, if a given additive concentration produces visual defects that are easily detectable, then there is no reason to increase the additive concentration any further. For example, the oxalate may, without limitation, be added to the thermoplastic in the range of 1 to 5 weight percent (wt %). Similarly, if the additive decomposes too early (at an appropriate processing temperature for the thermoplastic), then an additive with a higher decomposition temperature might be selected. If the additive fails to decomposes too late (at a temperature exceeding the maximum processing temperature for the thermoplastic), then an additive with a lower decomposition temperature might be selected.

If the thermoplastic resin were processed outside the recommended processing conditions in the absence of the oxalate, the improper processing conditions are unlikely to result in a visible defect in the molded plastic part. However, the improper processing conditions can result in compromised physical properties of the plastic part. These types of defects often go undetected until after the plastic part has been put into use. Using a suitable concentration of a thermally decomposable additive causes an immediately visible indication that the thermoplastic was processed under improper conditions and that the resulting plastic part should not be used.

In one embodiment of the present invention, the method further comprises detecting whether the molded plastic part has surface irregularities indicating that the processing conditions for the thermoplastic were improper. More specifically, the detection of surface irregularities in the molded plastic part indicates that the plastic part was formed at a temperature exceeding the recommending processing temperature and that the physical properties of the thermoplastic may be compromised. Optionally, the method may then further include discarding the molded plastic part in response to detecting surface irregularities in the plastic part. Conversely, the method may further include installing the molded plastic part in a finished product in response to detecting no surface irregularities in the plastic part.

Detecting whether the molded plastic part has surface irregularities may include visually inspecting the molded plastic part. The ability to visually detect the surface irregularities and attribute those irregularities to improper processing conditions is very beneficial. For one thing, the manufacturer of the plastic part is unable to hide the surface defects and is thereby prevented from processing plastic parts outside the recommended processing conditions. The term "visual" is intended to encompass both human sight and the use of optical detection techniques, such as microscopes and image analysis software.

A plastics manufacturer will typically characterize the resin formulation using a battery of analytical test. For example, rheology may be utilized to determine the melt temperature (Tm), and viscosity and thermogravimetric analysis may be used to determine the decomposition temperature (Td). The processing temperature (Tp) is selected such that Tm<Tp<Td. Once the resin has been characterized using these analytical techniques, mold flow analysis (via commercially available software) is generally conducted to establish an initial set of injection molding parameters. An actual mold trial is finally conducted to refine the processing conditions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
injection molding a plastic part from a polymer formulation comprising an injection moldable thermoplastic and an additive, wherein the additive has a decomposition temperature that is greater than or equal to a maximum processing temperature for the thermoplastic and establishes a maximum processing temperature for the polymer formulation, wherein the additive will thermally decompose to generate gaseous products causing visible bubble formation in the surface of the plastic part in response to exposure to a processing temperature that exceeds the decomposition temperature of the additive, and wherein the additive has essentially no negative effect on the physical properties of the plastic part when the processing temperature is less than the decomposition temperature of the additive.

2. The method of claim 1, further comprising:
detecting whether the plastic part has surface irregularities indicating that the processing temperature exceeded a target processing temperature for the thermoplastic.

3. The method of claim 2, further comprising:
discarding the plastic part in response to detecting surface irregularities in the plastic part.

4. The method of claim 2, further comprising:
installing the molded plastic part in a finished product in response to detecting no surface irregularities in the plastic part.

5. The method of claim 2, wherein the step of detecting whether the plastic part has surface irregularities includes visually inspecting the molded plastic part.

6. The method of claim 1, further comprising:
visually inspecting the plastic part for the presence of bubbles in the surface of the plastic part, wherein the presence of bubbles indicates that the processing temperature exceeded the decomposition temperature of the additive.

7. The method of claim 1, wherein the surface irregularities are selected from bubbles and voids.

8. The method of claim 1, wherein the additive comprises less than five percent of the polymer formulation.

9. The method of claim 1, wherein the additive is inert to reactions with the thermoplastic.

10. The method of claim 1, wherein the gaseous products are selected from water vapor, carbon monoxide, carbon dioxide, and combinations thereof.

11. The method of claim 1, wherein the additive is selected from oxalates, carbamic acids, carbonic acids, diazocarbonyl compounds, and combinations thereof.

12. The method of claim 1, wherein the additive comprises an oxalate.

13. The method of claim 1, wherein the injection moldable thermoplastic is selected from polycarbonate (PC), acrylonitrile butadiene styrene (ABS), polyethylene terephthalate (PET), polybutylene terephthalate (PBT), liquid crystal polymers (LCP), polyamide (PA), and polyphenylene oxide (PPO).

14. The method of claim 1, wherein the injection moldable thermoplastic is a blend of polycarbonate and acrylonitrile butadiene styrene.

15. The method of claim 14, wherein the additive is copper oxalate or cobalt oxalate.

16. The method of claim 14, wherein the additive is manganese oxalate.

* * * * *